United States Patent
Wang et al.

(10) Patent No.: US 8,644,353 B2
(45) Date of Patent: *Feb. 4, 2014

(54) PACKET FLOW SIDE CHANNEL

(75) Inventors: Xinyuan Wang, Clifton, VA (US); Shiping Chen, Dublin, CA (US); Sushil Jajodia, Oakton, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 218 days.

This patent is subject to a terminal disclaimer.

(21) Appl. No.: 12/894,808

(22) Filed: Sep. 30, 2010

(65) Prior Publication Data

US 2011/0069721 A1 Mar. 24, 2011

Related U.S. Application Data

(63) Continuation of application No. 11/556,220, filed on Nov. 3, 2006, now Pat. No. 7,822,073.

(60) Provisional application No. 60/732,672, filed on Nov. 3, 2005, provisional application No. 60/757,883, filed on Jan. 11, 2006.

(51) Int. Cl.
*H04J 3/06* (2006.01)
*H04J 3/16* (2006.01)
*H04J 3/00* (2006.01)

(52) U.S. Cl.
USPC .......................... 370/516; 370/465; 370/529

(58) Field of Classification Search
USPC ................. 370/241, 252, 465, 503, 516, 529
See application file for complete search history.

(56) References Cited

U.S. PATENT DOCUMENTS

| | | | |
|---|---|---|---|
| 3,700,820 | A | 10/1972 | Blasbalg et al. |
| 6,385,329 | B1 | 5/2002 | Sharma et al. |
| 6,580,694 | B1 | 6/2003 | Baker |
| 6,584,125 | B1 | 6/2003 | Katto |
| 6,728,678 | B2 | 4/2004 | Bhadkamkar et al. |
| 6,754,203 | B2 | 6/2004 | Wah et al. |
| 6,868,094 | B1 | 3/2005 | Bordonaro et al. |
| 6,956,871 | B2 * | 10/2005 | Wang et al. ............ 370/503 |
| 7,061,938 | B2 | 6/2006 | Hogeboom |
| 7,260,220 | B2 | 8/2007 | Steenhof et al. |
| 7,295,578 | B1 | 11/2007 | Lyle et al. |
| 7,333,517 | B2 | 2/2008 | Madhavapeddi et al. |
| 7,583,705 | B2 * | 9/2009 | Sinha et al. .............. 370/503 |
| 8,322,059 | B2 * | 12/2012 | Henshaw ................. 40/586 |

(Continued)

OTHER PUBLICATIONS

Anonymizer, URL.//www.anonymizer.com, Jan. 10, 2006.

(Continued)

*Primary Examiner* — Warner Wong
(74) *Attorney, Agent, or Firm* — DLA Piper LLP (US)

(57) ABSTRACT

A packet flow side channel encoder and decoder embeds and extracts a side channel communication in an overt communication data stream transmitted over a network. The encoder selects more than one group of related packets being transmitted on the network, relates a packet of one group to a packet of another group to form a pair of packets; and delays the timing of at least one packet from each pair of packets The decoder determines inter-packet delays that are the difference in timing between two packets in a pair of packets; determines at least one inter-packet delay difference between two or more determined inter-packet delays; and extracts a bit using the at least one interpacket delay difference.

20 Claims, 14 Drawing Sheets

(56) References Cited

U.S. PATENT DOCUMENTS

| | | | |
|---|---|---|---|
| 2003/0048812 | A1 | 3/2003 | Gross |
| 2003/0185246 | A1 | 10/2003 | Grob-Lipski |
| 2003/0198256 | A1 | 10/2003 | Wang et al. |
| 2004/0085954 | A1 | 5/2004 | Iacovino et al. |
| 2004/0184469 | A1 | 9/2004 | Choi et al. |
| 2005/0185678 | A1 | 8/2005 | Tsuchinaga et al. |
| 2006/0013263 | A1* | 1/2006 | Fellman .................. 370/503 |
| 2007/0002902 | A1 | 1/2007 | Hannuksela |

OTHER PUBLICATIONS

M. Arango, A. Dugan, I. Elliott, C. Huitema and S. Pickett, RFC 2705: Media Gateway Control Protocol (MGCP) Version 1.0 IETF, Oct. 1999.
A. Back, I. Goldberg, and A. Shostack, Freedom 2.1 Security Issues and Analysis. Zero-Knowledge Systems, Inc. white paper, May 2001.
S. A. Baset and H Schulzrinne. An Analysis of the Skype Peer-to-Peer Internet Telephony Protocol. Columbia Technical Report CUCS-039-04, Dec. 2004.
A. Blum, D. Song, and S. Venkataraman. Detection of Interactive Stepping Stones: Algorithms andConfidence Bounds In Proceedings of the 7th International Symposium on Recent Advances in Intrusion Detection (RAID 2004), Springer, Oct. 2004.
R. Dingledine, N. Mathewson and and P. Syverson. Tor: The Second Generation Onion Router. In Proceedings of the 13th USENIX Security Symposium, Aug. 2000.
D. L. Donoho, A. G. Fiesia, U. Shenker, V. Paxson, J. Coit and S. Staniford. Multiscale Stepping Stone Detection: Detecting Pairs of Jittered Interactive Streams by Exploiting Maximum Tolerable Delay. In Proceedings of the 5th International Symposium on Recent Advances in Intrusion Detection (RAID 2002): LNCS-2516, pp. 17-35. Springer, Oct. 2002.
FBI. Letter to FCC http://www.askcalea.com/docs/20040128.jper.letter.pdf, Jan. 28, 2004.
Federal Communications Commission. Notice of Proposed Rulemaking (NPRM) and Declaratory Ruling RM-10865, FCC 04-187 In Federal Register at 69 Fed. Reg. 56956, Aug. 2004.
E. W. Felton and M. A. Schneider. Timing Attacks on Web Privacy. In Proceedings of the 7th ACM Conference on Computer and Communications Security (CCS 2000), pp. 25.32 ACM, Nov. 2000.
Findnot, URL http://www.findnot.com, Dec. 31, 2005.
M. J Freedman and R. Morris. Tarzana A Peer-to-Peer Anonymizing Network Layer, In Proceedings of the 9th ACM Conference,(CCS 2002), pp. 193-206. ACM, Nov. 2003.
D. Goldschiag. M. Reed and P. Syverson Onion Routing for Anonymous and Private Internet Connections in Communications of ACM, vol. 42(2), Feb. 1999.
M. T. Goodrich. Efficient Packet Marking for Large-scale IP Traceback. In Proceedings of the 9th ACM Conference on Computer andCommunications Security (CC'S 2002), pp. 117-126. ACM, Oct. 2002.
ITU-T Recommendation H 323v.4 Packet-based Multimedia Communications Systems, Nov. 2000.
Kazaa. URL. http://www.kazaa.com/, Jan. 10, 2006.
T. Kohno, A. Broido and K. Claffy. Remote Physical Device Fingerprinting. In Proceedings of the 2005 IEEE Symposium on Security and Privacy, IEEE, 2005.
B. Levine, M. Reiter, C. Wang, and M. Wright. Timing Attacks in Low-Latency Mix Systems. In Proceedings of Financial Cryptography: 8th International Conference (FC 2004): LNCS-3110, 2004.
J. Li, M. Sung, J. Xu and L Li. Large Scale IP Traceback in High-Speed Internet: Practical Techniques and Theoretical Foundation. In Proceedings of the 2004 IEEE Symposium on Security and Privacy, IEEE, 2004.
S. J. Murdoch and G. Danezis. Low-Cost Traffic Analysis of Tor. In Proceedings of the 2005 IEEE Symposium on Security and Privacy, IEEE, 2004.
A. Pfitzrmann, B Pfitzmann and M. Waidiler, ISDN-MIXes Untraceable Communication with with Small Bandwidth Overhead. In Proceedings of GI/ITG conference: Communication in Distributed Systems, Mannheim, Informatik-Fachberichte 267, pp. 451-463, Springer-Verlag, 1991.
J. Rosenberg, H. Schuizrinne, G. Camarillo, A. R. Johnston, J. Peterson, R. Sparks, M. Handley, and E. Schooler. RFC 3261: SIP: Session Initiation Protocol. IETF, Jun. 2002.
RTAI. URL. http://www.rtai.org, Sep. 20, 2005.
S. Savage, D. Wetherell, A. Karlin and T. Anderson. Practical Network Support for IP Traceback. In Proceedings of ACM SIGCOMM 2000, pp. 295-306. ACM, Sep. 2000.
H. Schulzrinne. Internet Telephony. In Practical Handbook of Internet Computing, CRC, 2004.
H. Schulzrinne and J. Rosenberg. A Comparison of SIP and H. 323 for Internet Telephony. In Proceedings of International Workshop on Network and Operating System Support for Digital Audio and video (NOSSDAV 1998), pp. 83-86, Cambridge, England, Jul. 1998.
H. Schulzrinne and J. Rosenberg. Signaling for Internet Telephony. In Proceedings of The 6th IEEE International Conference on Network Protocols (ICNP'98), Oct. 1998.
Skype—The Global Internet Telephony Company. UR.L. http://www.skype.org, Jan. 10, 2006.
S. Snapp, J. Brentano., G. V. Dias, T. L. Goan, L. T. Heberlein, C. Ho, K. N. Levitt, B. Eviukherjee, S. E. Smahal, T. Grance, D. M. Teal, and D. Mansur. DIDS (Distributed Intrusion Detection System) Motivation, Architecture, and Early Prototype. In Proceedings of the 14th National Computer Security Conference, pp. 167-176, 1991.
A. Snoeren, C. Patridge, L. A. Sanchez, C. E. Jones, F. Tchakountio, S.T. Kent, and W. T. Strayer, Hash-based IP Traceback. In Proceedings of ACM SIGCOMM 2001, pp. 3-14. ACM, Sep. 2001.
S. Staniford-Chen and L. Heberiein. Holding Intruders Accountable on the Internet. In Proceedings of the 1995 IEEE Symposium on Security and Privacy, pp. 39-49. IEEE, 1995.
X. Wang and D. Reeves. Robust Correlation of Encrypted Attack Traffic Through Stepping Stones by Manipulation of Interpacket Delays. In Proceedings of the 10th ACM Conference on Computer and Communications Security (CCS 2003), pp. 20-29. ACM, Oct. 2003.
X. Wang, D. Reeves, and S. Wu. Inter-packet Delay Based Correlation for Tracing Encrypted Connections Through Stepping Stones. In Proceedings of the 7th European Symposium on Research in Computer Security (ESORICS 2002), LNCS-2502, pp. 244-263. Springer-Verlag, Oct. 2002.
K. Yoda and H. Eton. Finding a Connection Chain for Tracing Intruders, In Proccedings of the 6th European Symposium on Research in Computer Security (ESORICS 2002), LNCS-1895, pp. 191-205. Springer-Verlag, Oct. 2002.
Y. Zhang and V. Paxson. Detecting Stepping Stones. In Proccedings of the 9th USENIX Security Symposium, pp. 171-184. USENIX, 2000.
Image File Wrapper of Related U.S. Appl. No. 11/556,220 electronically captured on Aug. 12, 2013.
NLANR trace archive, http://pma.nlanr.net/tracesilong/, Jul. 17, 2013.
P. Peng, P. Ning, D. S. Reeves, and X. Wang. Active timing-based correlation fo perturbed traffic flows with chaff packets. Technical Report TR-2005-11, Department of Computer Science, NC State Univ., 2005.
X. Wang, D. S. Reeves, P. Ning, and F. Feng. Robust network-based attack attribution through probabilistic watermarking of packet flows. Technical Report TR-2005-10, Department of Computer Science, NC State Univ., 2005.
X. Wang, D. S. Reeves, S. F. Wu, and J. Yuill. Sleepy watermark tracing: An active network-based intrusion response framework. In Proceedings of 16th International Conference on Information Security (IFIP/Sec'01), 2001.
Y. Zhang and V. Paxson. Detecting stepping stones. In Proceedings of 9th USENIX Security Symposium, pp. 171184, 2000.

* cited by examiner

PACKET FLOW SIDE CHANNEL

CROSS-REFERENCES TO RELATED APPLICATIONS

This application is a continuation of application Ser. No. 11/556,220, filed Nov. 3, 2006, which claims the benefit of U.S. Provisional Application No. 60/732,672, filed Nov. 3, 2005, and U.S. Provisional Application No. 60/757,883, filed Jan. 11, 2006, which are both hereby incorporated in whole by reference.

STATEMENT REGARDING FEDERALLY SPONSORED RESEARCH OR DEVELOPMENT

This invention was made with government support under grant F30602-00-2-0512 awarded by the Air Force Research Laboratory, Rome and under grant DAAD19-03-1-0257 and W911NF-05-1-0374 awarded by the Army Research Office.

BRIEF DESCRIPTION OF THE DRAWINGS

Various embodiments of the systems and methods will be described in detail, with reference to the following figures, wherein:

FIG. 6B shows the distribution of 10422 IPD differences of a terminating VoIP flow used in an experiment of an aspect of an embodiment of the present invention;

DETAILED DESCRIPTION OF EMBODIMENTS

Embodiments of the present invention may be used to track packetized data streams such as anonymous peer-to-peer Voice over IP (VoIP) calls on network(s) such as the internet. Additionally, embodiments of the present invention may also be used to transport data over a side channel of a normal packetized data stream over network. In many embodiments of the invention, the side channel data can be covert. The following detailed description describes various embodiments of the invention.

Figure 1:
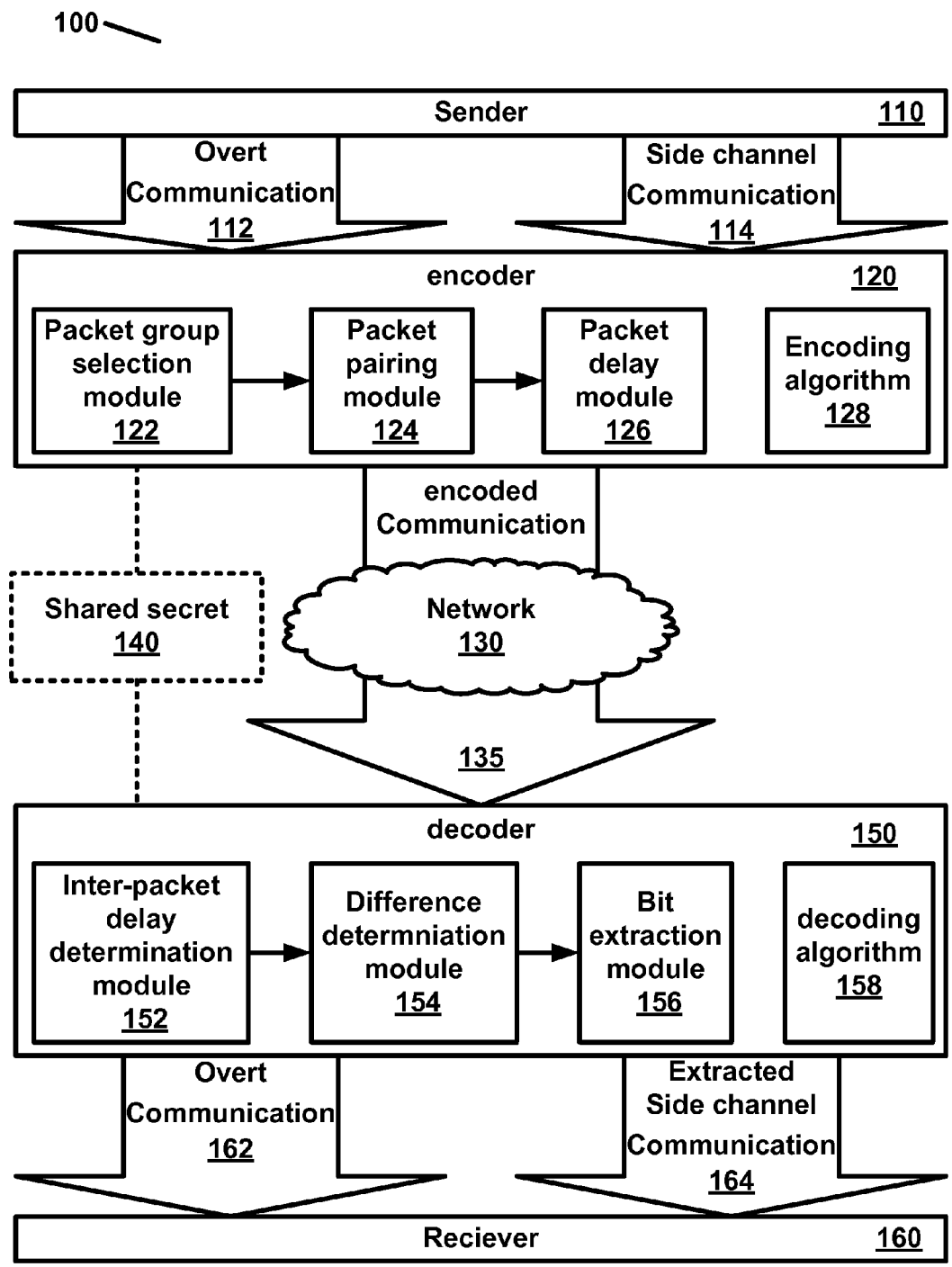
FIG. 1 is a block diagram of a packet flow side channel system as per an aspect of an embodiment of the invention.

A block diagram of an embodiment of a system 100 for embedding a side channel communication 114 in an overt communication 112 transmitted over a network 130 using a packet stream 135 is shown in FIG. 1. The system includes an encoder 120 on a sender 110 side of network 130 and a decoder 150 on a receiver 160 side of network 230.

The overt communication 112 may be any type of packetized data stream with the data in the open or encrypted. Examples of overt communication 112 data streams include but are not limited to video streams, audio streams, VoIP data streams, web data streams, and transactional data streams. The side channel communication 114 is not limited to packetized data and can be any type of data, limited only by operational bandwidth of specific embodiments of the present invention. Examples of side channel communication 114 data includes but is not limited to watermarks, audio data, video data, database data, secrets, and data used to identify the main overt communication 112.

The encoder 120 is preferably configured to encode one or more bits of a side channel communication 114 into overt communication 112. Encoder 120 should include: a packet group selection module 122, a packet pairing module 124, and a packet delay module 126. Packet group selection module 122 should be configured to select at least two groups of related packets to be transmitted on network 130. Although each group of packets should contain the same number of packets, it is possible that embodiments could be configured where the each of the groups of packets are not exactly the same. Packet pairing module 124 should be configured to relate a packet of one group to a packet of another group to form a pair of packets. Packet delay module 126 should be configured to delay the timing of at least one packet from each pair of packets. An encoding algorithm 128 may be used by encoder 120 in performing any or all of the functional operations for packet group selection module 122, a packet pairing module 124, and a packet delay module 126.

The decoder 150 is preferably configured to decode the bit from the side channel communication 114. Decoder 150 preferably includes an inter-packet delay determination module 152, a difference determination module 154, and a bit extraction module 156. Inter-packet delay determination module 152 is preferably configured to determine the difference in timing between two packets in a pair of packets. Difference determination module 154 is preferably configured to determine at least one inter-packet delay difference between two or more determined inter-packet delays. The inter-packet characteristics are likely to be preserved in a network packet flow across intermediate network peers and low latency anonymizing networks. Also, when inter-packet delays are determined for two or more pairs of packets, the difference between two or more inter-packet delays may be calculated. Bit extraction module 156 is preferably configured to convert interpacket delay differences into a bit. Decoding algorithm 158 may be used by the decoder in performing any or all of the functional operations for the inter-packet delay determination module 152, a difference determination module 154, and a bit extraction module 156. It may be necessary for the decoder 150 to use a decoding algorithm 158 that is complementary to encoding algorithm 128. In some embodiments, the encoder 120 and the decoder 150 may use a shared secret.

Embodiment of the present invention may be implemented at different locations along the overt data communication 112 data path between the sender 110 and the receiver 160. Possible locations include but are not limited to sender 110 hardware, in routers, in firewalls, in Ethernet modules, and in the receiver 160. In the case of a router, the encoder 120 and the decoder 150 may be located on opposite sides of a router or in two separate routers. In fact, there can be more than one encoder and decoder in a system. When trying to track communications using the side channel communication 114 data, it may be useful to locate multiple decoders 150 throughout network 130 to determine location information about a receiver 160.

It is envisioned that modules may be implemented individually or as a combination of software, firmware and hardware. One skilled in the art will recognize that there are many ways to implement these embodiments, including producing specialized chips, or running software on various pieces of hardware. However, it is important that the embodiments be capable of processing packetized data streams. Although it may be preferable in some specific embodiments that this processing be achieved real-time, one skilled in the art could easily see situations where any of these processing steps could be performed before an encoded message 128 is passed through a network 130.

Aspects of the embodiments may be implemented as methods. These methods may also be substantiated in software, firmware, hardware, or a combination of the above. Software embodiments may be implemented as a series of instructions stored on a tangible computer readable media (such as a disc or solid state memory) that when executed by one or more processors, causes the method to be performed.

Figure 2:
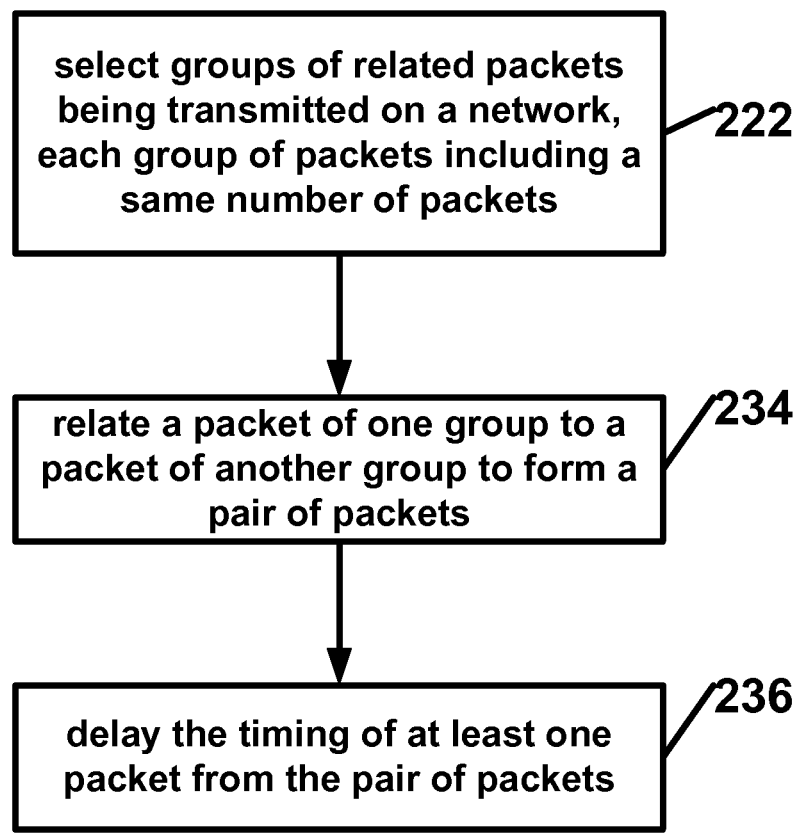
FIG. 2 is a flow diagram of an encoder as per an aspect of an embodiment of the invention.

FIG. 2 is a flow diagram that describes an embodiment for a method that embeds a side channel communication 114 in an overt communication 112 transmitted over a network 130, such as the internet, a network or any other communication medium, using a packet stream 135. The method includes encoding one or more bits of a side channel communication 114. More than one group of related packets that are to be transmitted on a network are selected at 222. In some embodiments, the packets may be selected according to an algorithm, randomly, or pseudo-randomly. Each group of packets may include a same number of packets; however, as described in the system description, it is possible that some embodiment may not require the packets to be equally sized. At 234, a packet of one group may be related to a packet of another group to form a pair of packets. The delaying may include delaying the timing of the at least one packet without buffering the packets. At 236, the timing of at least one packet may be delayed from each pair of packets. These actions may run according to an encoding algorithm.

To increase the probability of the side channel communication 114 data being recovered accurately, the data may be repeated multiple times. This data redundancy may then be taken into account when the side channel communication 114 data is extracted. Basically, one bit of the side channel communication 114 data may correspond to an average of several differences between different inter-packet delays. For example, one bit of the side channel communication 114 data may correspond to the difference between different inter-packet delays, but may also be the average of the differences between 4, 6, 8, . . . 2n inter-packet delays, where n is an integer number representing the redundancy of the side channel communication 114 data. It should also be noted that the side channel communication 114 data may include more than one bit, each bit of the side channel communication 114 data corresponding to a difference between specific inter-packet delays, or to an average or other formulation of several differences between two different inter-packet delays.

Figure 3:
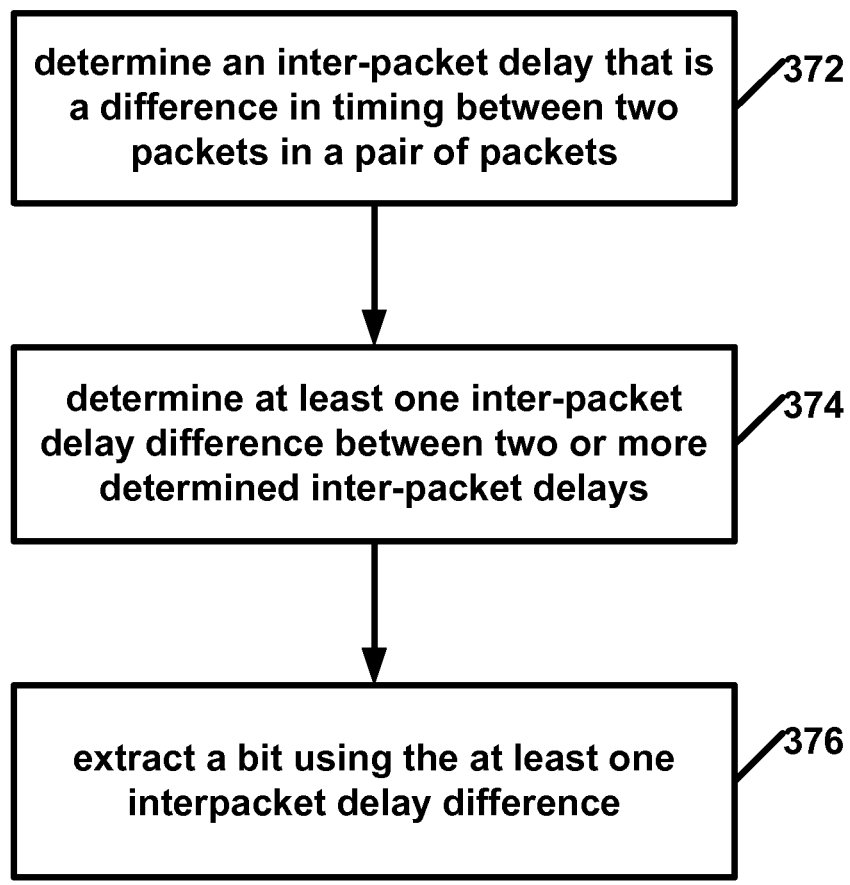
FIG. 3 is a flow diagram of a decoder as per an aspect of an embodiment of the invention.

A flow diagram for an embodiment of a method that extracts a side channel communication 114 in an overt communication 112 transmitted over a network 130 using a packet stream 135 id shown in FIG. 3. This method preferably decodes a bit from a side channel communication 114 by: determining inter-packet delays that are the difference in timing between two packets in a pair of packets at 372; determining at least one inter-packet delay difference between two or more determined inter-packet delays at 374; and extracting the bit using at least one interpacket delay difference at 376. These actions may run according to a decoding algorithm. The algorithm may need to be complementary to an encoding algorithm.

Tracking Anonymous Peer-to-Peer VoIP Calls on the Internet

Although embodiments of the present invention may be used to transport many different kinds of side channel information, we will now discuss a particular application where the side channel may be used to track anonymous Peer-to-peer VoIP calls. Peer-to-peer VoIP calls have become popular due to their advantages in cost and convenience. When these calls are encrypted from end to end and anonymized by low latency anonymizing network, they are considered by many people to be both secure and anonymous.

Embodiments of the present invention may be used where the side channel is watermarked so that encrypted peer-to-peer VoIP calls, even if they are anonymized by low latency anonymizing networks, may be identified and correlating. This result is in contrast to many people's perception. The key idea is to embed a unique watermark into the encrypted VoIP flow by slightly adjusting the timing of selected packets. Analysis shows that it may only take several milliseconds time adjustment to make normal VoIP flows highly unique. The embedded watermark may be preserved across the low latency anonymizing network by applying redundancy. Analytical results are backed up by the real-time experiments performed on leading peer-to-peer VoIP client and on a commercially deployed anonymizing network. The results demonstrate that (1) tracking anonymous peer-to-peer VoIP calls on the Internet is feasible and (2) low latency anonymizing networks are susceptible to timing attacks.

VoIP is a technology that allows people to make phone calls through the public Internet rather than traditional Public Switched Telephone Network (PSTN). Because VoIP offers significant cost savings with more flexible and advanced features over Plain Old Telephone System (POTS), more and more voice calls are now carried at least partially via VoIP.

For privacy reasons, some people may want their phone conversation to be anonymous so that other people will not know that they have even talked over the phone. The use of VoIP has made it much easier to achieve anonymity in voice communications, especially when VoIP calls are made between computers. This is because VoIP calls between peer computers have no phone numbers associated with them, and they could easily be protected by end to end encryption and routed through low latency anonymizing networks (e.g., Onion Routing, Tor, Freedom, and Tarzan) to achieve anonymity. People intuitively think their computer to computer VoIP calls could remain anonymous if they are encrypted end to end and routed through some low latency anonymizing network.

On the other hand, law enforcement agencies (LEA) often need to conduct lawful electronic surveillance in order to combat crime and terrorism. For example, the LEAs leed techniques to determine who has called the surveillance target and to whom the surveillance target has called. In a letter to FCC, several federal law enforcement agencies have considered the capability of tracking VoIP calls of paramount importance to the law enforcement and the national security interests of the United States.

Embodiments of the present invention were tested against the popular Skype peer-to-peer VoIP calls in the context of the anonymous VPN provided by findnot.com. Skype offers free computer to computer VoIP calls based on KaZaa peer-to-peer technology. Several properties of Skype have made it an attractive candidate for the investigating the performance of tracking anonymous VoIP calls on the Internet using embodiments of the present invention:

- It is free and widely used. Since August 2003, there are over 100 million downloads of the Skype client. It is being actively used by millions of people all over the world. Skype is now included in Kazaa v3.0.
- All the Skype traffic is encrypted from end to end by 256-bit AES encryption.
- Skype can automatically traverse most firewalls and NAT (Network Address Translation) gateways with the help of intermediate peers.
- Skype intelligently and dynamically routes the encrypted calls through different peers to achieve low latency. This means that the route and the intermediate peer(s) of one VoIP call could be changed during a call.
- It uses proprietary peer-to-peer signaling protocol to set up the VoIP calls.

Since most Skype calls are carried in UDP, it may not make sense to use those anonymizing systems (such as Onion Routing, Tor or anonymizer.com, who do not support anonymization of all UDP flows, to anonymize Skype VoIP calls. Therefore, it makes sense to use an anonymous communication service such as findnot.com, that supports anonymization of all IP protocols through point to point tunnel protocol (PPTP).

A challenge in tracking encrypted VoIP calls across anonymous communication system is how to identify the correlation between the VoIP flows of the caller and the callee. Since all the traffic of the peer-to-peer VoIP calls are encrypted, signaling information may not be available for correlation. To track encrypted, anonymous VoIP calls across the Internet, the timing characteristics of the anonymized VoIP flow may be used. Unfortunately, the original inter-packet arrival characteristics of VoIP flows are not distinct enough as the inter-packet timing arrival time of VoIP traffic is generally determined by the frame packetization interval used. This means that passive comparison of the original inter-packet timing characteristics of VoIP flows may not be able to distinguish different VoIP calls.

In order to uniquely identify the anonymous VoIP calls through inter-packet timing characteristics, an active approach to deliberately make the inter-packet timing of VoIP calls more distinctive may be used. The idea is to embed a unique watermark into the inter-packet timing of the VoIP flows by slightly adjusting the timing of selected packets. If the embedded watermark is unique enough and robust enough, the watermarked VoIP flows could be effectively identified. By utilizing redundancy techniques, the embedded watermark may be made robust against random timing perturbation provided there are enough packets in the VoIP flow.

Analytical and experimental results demonstrate that using embodiments of the present invention (1) tracking anonymous peer-to-peer VoIP calls on the Internet is feasible and (2) low latency anonimizing systems are susceptible to timing attack. The disclosed VoIP tracking technique may not require the global monitoring capability, and it could be used to determine if party A is communicating (or has communicated) with party B via peer-to-peer VoIP even if the VoIP traffic is (or has been) disguised by low latency anonymous communication systems.

Figure 4:
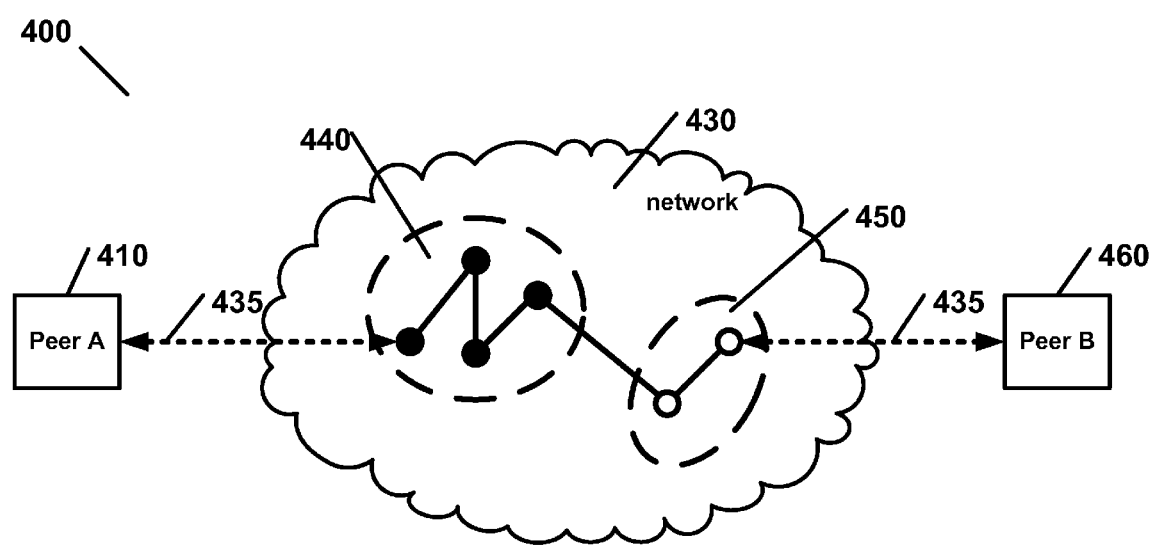
FIG. 4 is an illustration of an anonymous Peer-to-Peer VoIP Call Tracing Model.

FIG. 4 shows a block diagram of an Overall Model of Tracing Anonymous Peer-to-Peer VoIP Calls. Given any two different Skype peers A 410 and B 460, assume there is an interest in determining if A 410 is talking (or has talked) to B 460 via Skype peer-to-peer VoIP. As shown in FIG. 4, both Skype peers A 410 and B 460 have outgoing and incoming VoIP flows 420 and 425 to and from the Internet cloud 430. The Skype peers 410 and 460 could be behind a firewall or NAT, and peer A 410 and/or B 460 could be connected to some low latency anonymizing network 440. It may be helpful to view the Internet cloud 430 and any low latency anonymizing network 440 as a black box, and restrict interested only to Skype flows that enter or exit the black box. It is assumed that (1) the Skype flow from the black box to the Skype peer can be monitored; and (2) the timing of the Skype flow from the Skype peer to the black box can be perturbed.

The intent in this specific case (although other cases may change these conditions) is not to track all the peer-to-peer VoIP calls from anyone to anyone, nor is it assumed that there is a global monitoring and intercepting capability. Instead, the focus is on finding out if some parties in which there is an interest has communicated via peer-to-peer VoIP calls anonymously. Then there is only a needed capability to monitor and intercept IP flows to and from those interested parties. This model is consistent with many of the common practice of lawful electronic surveillance by the law enforcement agencies.

Because the Skype VoIP flows are encrypted from end to end, no correlation could be found from the flow content. Given that the Skype VoIP flow could pass some intermediate Skype peers 450 and some low latency anonymizing network 440, there should be no correlation from the VoIP flow headers. Among all the characteristics of the VoIP flows, the inter-packet timing characteristics are likely to be preserved across intermediate Skype peers 450 and low latency anonymizing networks 440. This invariant property of VoIP flows forms a foundation for tracking anonymous, peer-to-peer VoIP calls on the Internet.

A number of timing based correlation methods have been proposed, and they can be classified into two categories: passive and active. Passive timing based correlation approaches correlate the encrypted flows based on passive comparison of their timing characteristics, and they have been shown to be effective when the timing characteristics of each flow are unique enough. However, the inter-packet timing characteristics of all VoIP flows are very similar to each other. The inter-packet arrival time of VoIP flows may be determined by the voice codec and the corresponding packetization interval, and there may be only a few commonly used VoIP packetization intervals (i.e. 20 ms or 30 ms). Therefore, passively comparing the timing characteristics of VoIP flows should not be able to distinguish different VoIP flows.

To correlate anonymous VoIP flows with similar inter-packet timing characteristics, embodiments of the present invention use an active approach to deliberately yet subtly make the inter-packet timing characteristics of the VoIP flows more unique. This is achieved by embedding a unique watermark into the inter-packet timing domain of the VoIP flow in real-time. A key challenge in tracking anonymous VoIP calls by the active approach is how to precisely adjust the packet timing without buffering and guarantee the even time adjustment of those selected packets.

Active Timing Based Tracking of VoIP Flows:

Embodiments of the new watermarking scheme may guarantee the even time adjustment for embedding the watermark in real time and have all the theoretical strengths of work. The watermarking scheme is probabilistic in the sense that the watermark embedding success rate is not guaranteed 100%. In other words, the new watermarking scheme trades off the guaranteed 100% watermark embedding success rate with the guaranteed even time adjustment for embedding the watermark. By exploiting the inherent inter-packet timing characteristics of the VoIP flows, the new watermarking scheme should achieve a virtually 100% watermark embedding success rate with guaranteed even time adjustment for embedding the watermark.

Basic Concept and Notion

Given any packet flow $P_1, \ldots, P_n$ with time stamps $t_1, \ldots, t_n$ respectively ($t_i < t_j$ for $1 \le i < j \le n$), one can independently and probabilistically choose a number of packets through the following process: (1) sequentially look at each of the first n−d (0<d≪n) packets; and (2) independently determine if the current packet will be probabilistically chosen, with probability $$p = \frac{2r}{n-d}\left(0 < r < \frac{n-d}{2}\right).$$

Here whether or not choosing the current packet is not affected by any previously chosen packets and it will not affect whether to choose any other packets. In other word, all the selected packets are selected independently from each other. Therefore, one can expect to have 2r distinct packets independently and randomly selected from any packet flow of n packets. The 2r randomly selected packets are denoted as $P_{z_1}, \ldots, P_{z_{2r}}$ ($1 \le z_k \le n-d$ for $1 \le k \le 2r$), and create 2r packet pairs: $\langle P_{z_k}, P_{z_k+d} \rangle$ (d≥1, k=1, ..., 2r).

The IPD (Inter-Packet Delay) between $P_{z_k+d}$ and $P_{z_k}$ is defined as $$ipd_{z_k,d} = t_{z_k+d} - t_{z_k}, (k=1, \ldots, 2r) \quad (1)$$

Because all $P_{z_k}$ (k=1, ..., 2r) are selected independently, $ipd_{z_k,d}$ is independent from each other. Since each $P_{z_k}$ is randomly and independently selected through the same process, $ipd_{z_k,d}$ is identically distributed no matter what inter-packet timing distribution the packet flow $P_1, \ldots, P_n$ may have. Therefore, $ipd_{z_k,d}$ (k=1, ..., 2r) is independent and identically distributed (iid).

The 2r IPDs may then be randomly (or pseudo-randomly) divided into 2 distinct groups of equal size. Let $ipd_{1,k,d}$ and $ipd_{2,k,d}$ (k=1, ..., r) denote the IPDs in group 1 and group 2 respectively. Apparently both $ipd_{1,k,d}$ and $ipd_{2,k,d}$ (k=1, ..., r) are iid. Therefore $E(ipd_{1,k,d}) = E(ipd_{2,k,d})$, and $Var(ipd_{1,k,d}) = Var(ipd_{2,k,d})$.

Let $$Y_{k,d} = \frac{ipd_{1,k,d} - ipd_{2,k,d}}{2} (k=1, \ldots, r) \quad (2)$$

Then we have $E(Y_{k,d}) = (E(ipd_{1,k,d}) - E(ipd_{2,k,d}))/2 = 0$. Because $ipd_{1,k,d}$ and $ipd_{2,k,d}$ are iid, $Y_{k,d}$ is also iid. We use $\sigma_{Y,d}^2$ to represent the variance.

We represent the average of r $Y_{k,d}$'s as $$\overline{Y_{r,d}} = \frac{1}{r}\sum_{k=1}^{r} Y_{k,d} \quad (3)$$

Here $\overline{Y_{r,d}}$ represents the average of a group of normalized IPD differences, with r called the redundancy number. According to the property of variance of independent random variables, $Var(\overline{Y_{r,d}}) = \sigma_{Y,d}^2/r$. Because $E(Y_{k,d}) = 0$ (k=1, ..., r), $E(\overline{Y_{r,d}}) = 0$. Because $Y_{k,d}$ is symmetric (k=1, ..., r), $\overline{Y_{r,d}}$ is also symmetric. Therefore, the distribution of $\overline{Y_{r,d}}$ is symmetrically centered around 0.

Figure 5A:
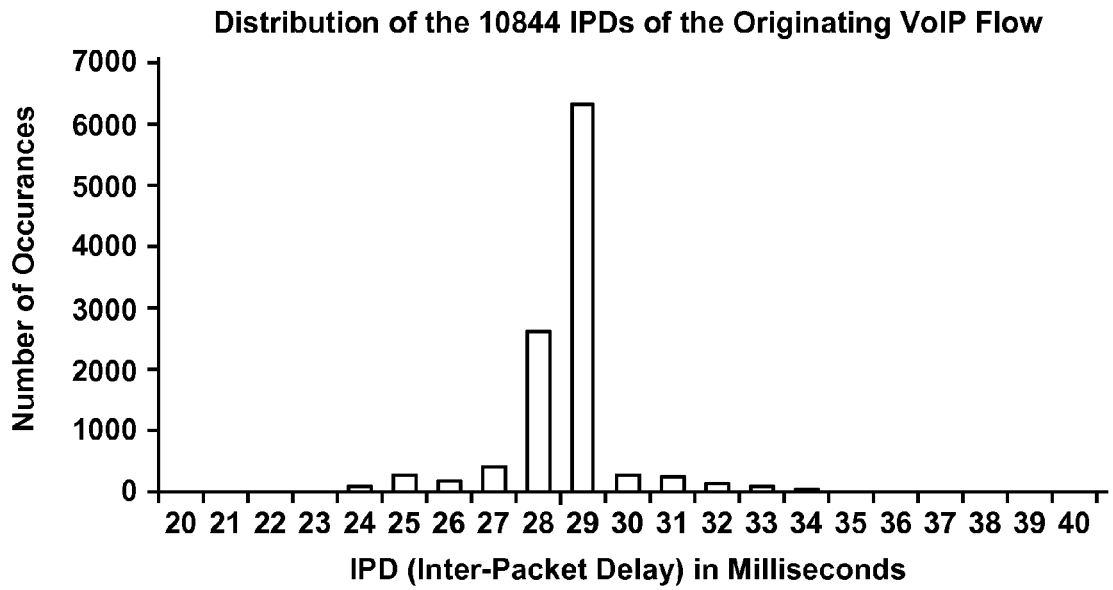
FIG. 5A shows the distribution of 10844 IPD's of an originating VoIP flow used in an experiment of an aspect of an embodiment of the present invention.
Figure 5B:
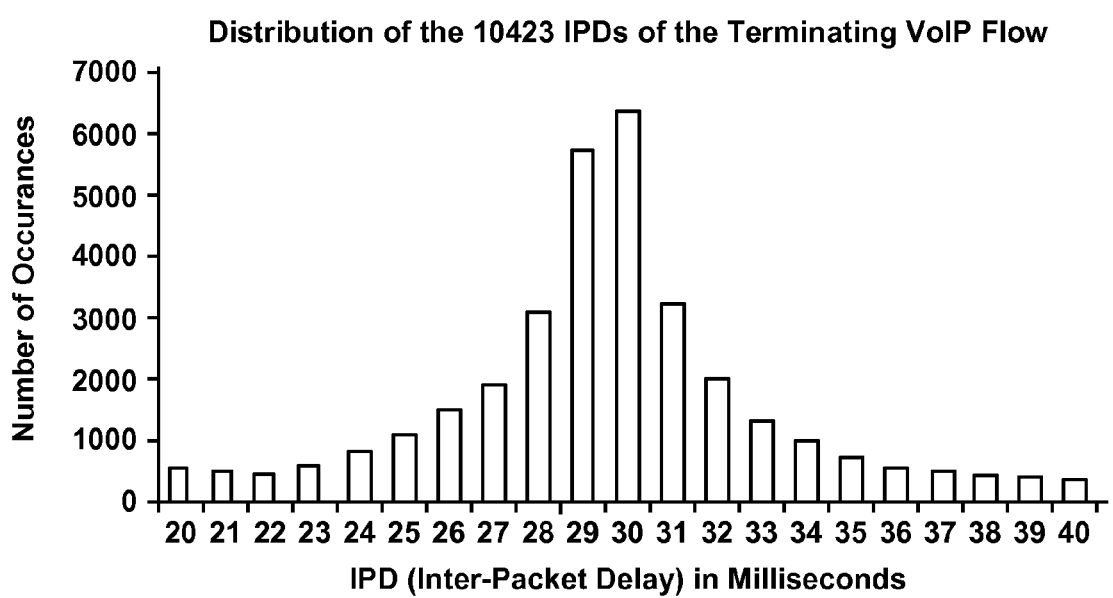
FIG. 5B shows the distribution of 10423 IPD's of a terminating VoIP flow used in an experiment of an aspect of an embodiment of the present invention.
Figure 6A:
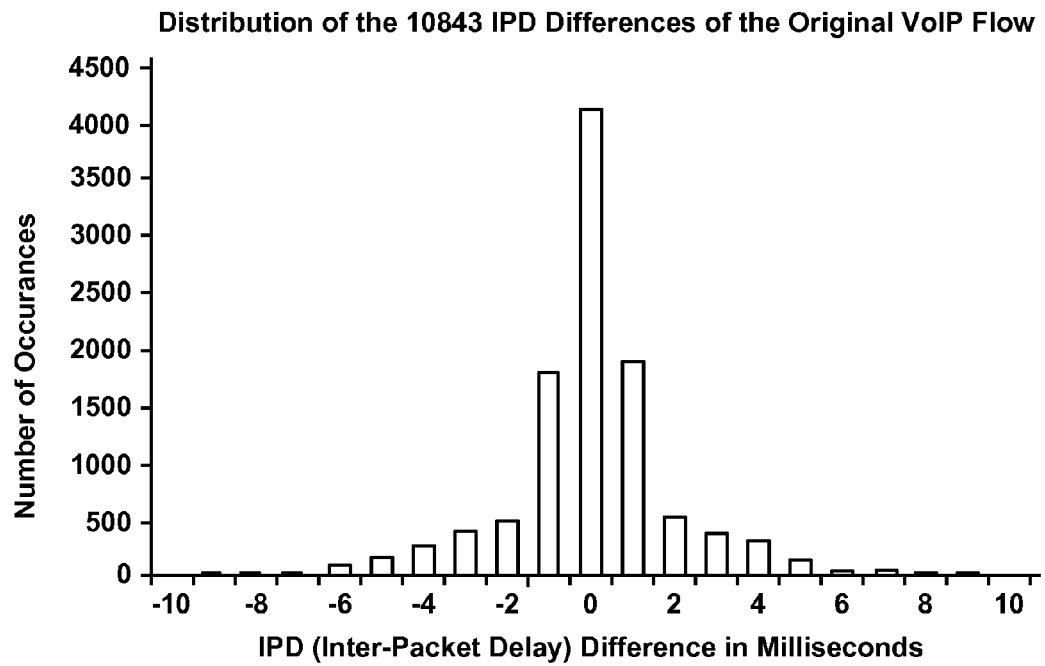
FIG. 6A shows the distribution of 10843 IPD differences of an originating VoIP flow used in an experiment of an aspect of an embodiment of the present invention.
Figure 6A:
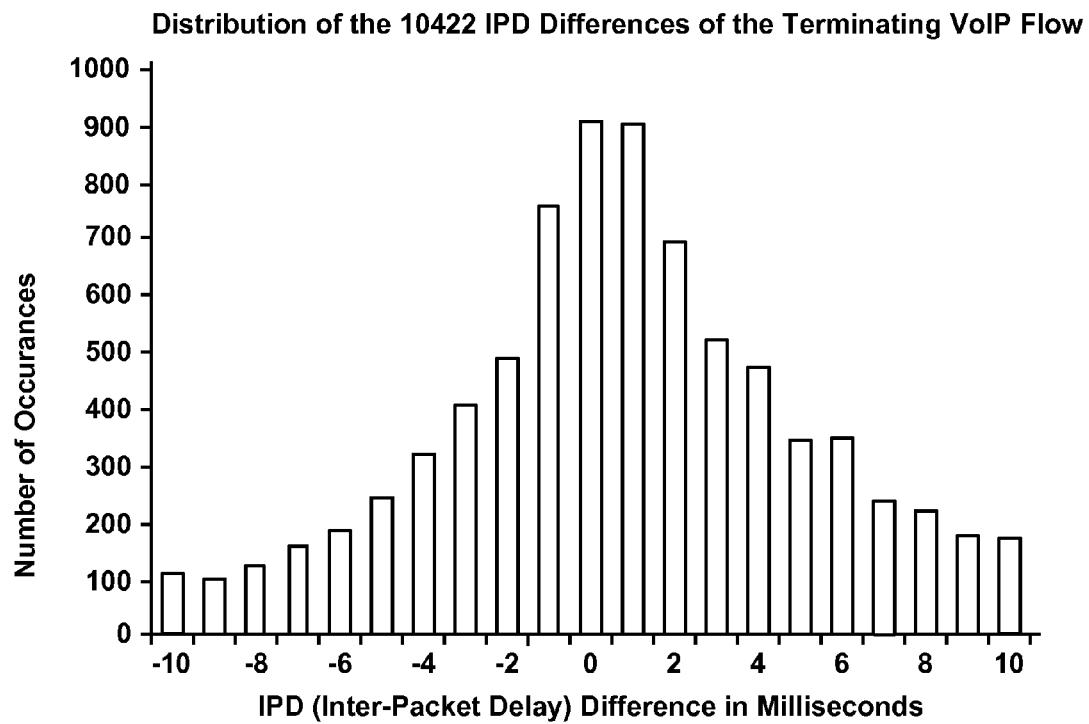

To illustrate the validity of concepts of $Y_{k,d}$ and $\overline{Y_{r,d}}$, two traces of the packet flows of a real Skype call were collected from two communicating Skype peers that are 27 hops and over a thousand miles away (when the Skype call is routed through the commercial findnot.com anonymizing network). One trace is for the Skype flow that originated from one Skype peer, and the other trace is for the Skype flow that terminated at the other Skype peer. These flows will be referred to as the originating flow and the terminating flow respectively. FIGS. 5A and 5B show the IPD histograms of the originating flow and the terminating flow respectively. They all have 30 ms average IPD, which indicates that the packetization interval of Skype VoIP call is 30 ms. While the IPDs of the originating Skype flow is more concentrated around 30 ms, the IPDs of the terminating Skype flow is less clustered due to the network delay jitter. FIGS. 6A and 6B show the histograms of $Y_{k,d}$ with d=1 (or equivalently $\overline{Y_{r,d}}$ with r=1 and d=1) of the Skype originating flow and the terminating flow respectively. They both confirm that the distribution of $\overline{Y_{r,d}}$ of Skype VoIP flows is indeed symmetric and centered around 0.

Embedding and Decoding a Binary Bit Probabilistically.

Since the distribution of $\overline{Y_{r,d}}$ is symmetric and centered around 0, the probabilities of $\overline{Y_{r,d}}$ to be positive and negative are equal. If $\overline{Y_{r,d}}$ is decreased or increased by an amount a>0, its distribution may be shifted to the left or right by a so that $\overline{Y_{r,d}}$ will be more likely to be negative or positive. This provides a way to embed and decode a single binary bit probabilistically.

To embed a bit 0, $\overline{Y_{r,d}}$ may be decreased by a, so that $\overline{Y_{r,d}}$ will have >0.5 probability to be less than 0. To embed a bit 1, $\overline{Y_{r,d}}$ may be increased by a, so that $\overline{Y_{r,d}}$ will have >0.5 probability to be greater than 0. By definition in equation (3), the decrease or increase of $\overline{Y_{r,d}}$ can be easily achieved by decreasing or increasing each of the r $Y_{k,d}$'s by a. By definition in equation (2), the decrease of $Y_{k,d}$ by a can be achieved by decreasing each $ipd_{1,k,d}$ by a and increasing each $ipd_{2,k,d}$ by a; the increase of $Y_{k,d}$ by a can be achieved by increasing each $ipd_{1,k,d}$ by a and decreasing each $ipd_{2,k,d}$ by a.

After $\overline{Y_{r,d}}$ has been decreased or increased by a, the embedded binary bit may be decoded by checking whether $\overline{Y_{r,d}}$ is less than or greater than 0. The decoding of the embedded binary bit is 1 if the value of $\overline{Y_{r,d}}$ is greater than 0, or 0 if the value of $\overline{Y_{r,d}}$ is less than or equal to 0. It is easy to see that probability of correct decoding is greater than that of wrong decoding.

Figure 7:
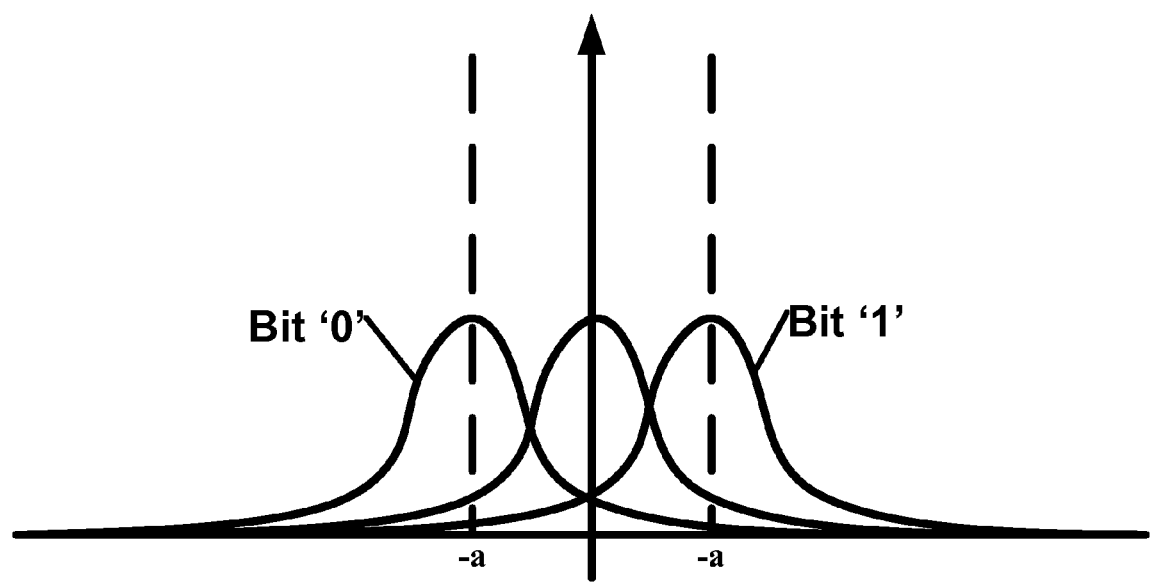
FIG. 7 is a plot showing the embedding of a binary bit as per an aspect of an embodiment of the present invention.

However, as shown in FIG. 7, there is a non-zero probability such that the embedded bit (with adjustment a>0) will be decoded incorrectly (i.e. $\overline{Y_{r,d}} > a$ or $\overline{Y_{r,d}} < -a$). We define the probability that the embedded bit will be decoded correctly as the bit embedding success rate w.r.t. adjustment a, which can be quantitatively expressed as $Pr(\overline{Y_{r,d}} < a)$.

Here the adjustment a is a representation of the watermark embedding strength. The larger the a is, the higher the bit embedding success rate should be. It will now be shown that even with arbitrarily small a>0 (or equivalently arbitrarily weak watermark embedding strength), one should be able to achieve arbitrarily close to a 100% bit embedding success rate by having a sufficiently large redundancy number r.

Central Limit Theorem If the random variables $X_1, \ldots, X_n$ form a random sample of size n from a given distribution X with mean $\mu$ and finite variance $\sigma^2$, then for any fixed number x $$\lim_{n \to \infty} Pr\left[\frac{\sqrt{n}(\overline{X_n} - \mu)}{\sigma} \le x\right] = \Phi(x) \quad (4)$$

where $\Phi(x) = \int_{-\infty}^{x} \frac{1}{\sqrt{2\pi}} e^{\frac{u^2}{2}} du$.

The theorem indicates that whenever a random sample of size n is taken from any distribution with mean $\mu$ and finite variance $\sigma^2$, the sample mean $\overline{X_n}$ will be approximately normally distributed with mean $\mu$ and variance $\sigma^2/n$, or equivalently the distribution of random variable $\sqrt{n}(\overline{X_n}-\mu)/\sigma$ will be approximately a standard normal distribution.

Applying the Central Limit Theorem to random sample $Y_{1,d}, \ldots, Y_{r,d}$, where $Var(Y_{k,d}) = \sigma_{Y,d}^2$, $E(Y_{k,d}) = 0$, one has $$Pr\left[\frac{\sqrt{r}(\overline{Y_{r,d}} - E(Y_{k,d}))}{\sqrt{Var(Y_{r,d})}} < x\right] = Pr\left[\frac{\sqrt{r}\overline{Y_{r,d}}}{\sigma_{Y,d}} < x\right] \approx \Phi(x) \quad (5)$$

Therefore $$Pr[\overline{Y_{r,d}} < a] = Pr\left[\frac{\sqrt{r}\overline{Y_{r,d}}}{\sigma_{Y,d}} < \frac{a\sqrt{r}}{\sigma_{Y,d}}\right] \approx \Phi\left(\frac{a\sqrt{r}}{\sigma_{Y,d}}\right) \quad (6)$$

This means that the distribution of the probabilistic watermark bit embedding success rate is approximately normally distributed with zero mean and variance $\sigma^2/r$.

Equation (6) gives an estimate of the probabilistic watermark bit embedding success rate. It indicates that no matter what distribution $Y_{k,d}$ may be, no matter what variance $Y_{k,d}$ may have (as long as it exists), no matter how small the timing adjustment a>0 (or the watermark embedding strength) might be, one can always make the watermark bit embedding success rate arbitrarily close to 100% by increasing the redundancy number r. This result should hold true regardless of the distribution of the inter-packet timing of the packet flow.

Figure 8:
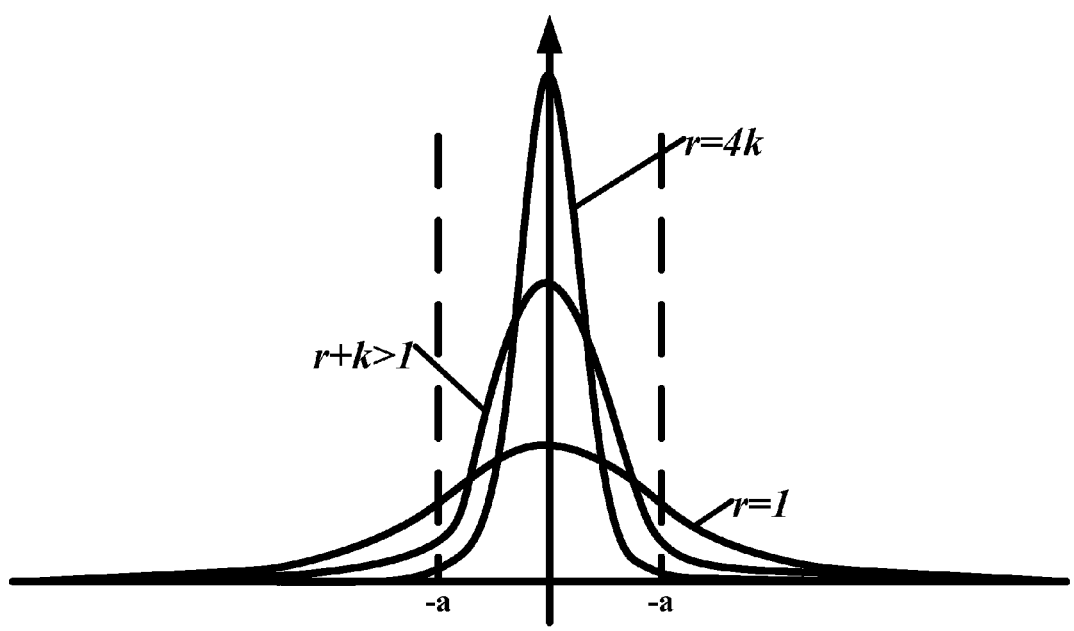
FIG. 8 is a plot showing a probability distribution of an embedded bit as per an aspect of an embodiment of the present invention.

FIG. 8 illustrates how the distribution of $\overline{Y_{r,d}}$ can be "squeezed" into range [−a, a] by increasing the redundancy number r.

Because the routers, intermediate Skype peers and the anonymizing network along the Skype VoIP call could introduce different delays over VoIP packets, one should consider the negative impact of such delay jitters over the watermark decoding.

Let $\sigma_d^2$ be the variance of all delays added to all packets, $X_k$ be the random variable that denotes the perturbation over $Y_{k,d}$ by the delay jitter, and $Y'_{k,d}$ be the random variable that denotes the resulting value of $Y_{k,d}$ after it has been perturbed by the delay jitter. One has the following quantitative tradeoff among the watermark bit detection rate, the defining characteristics of the delay jitter, and the defining characteristics of the original inter-packet timing of the VoIP flow $$Pr[\overline{Y'_{r,d}} < a] \approx \quad (7)$$
$$\Phi\left(\frac{a\sqrt{r}}{\sqrt{\sigma_{Y,d}^2 + \sigma_d^2 + 2Cor(Y_{k,d}, X_k)\sigma_{Y,d}\sigma_d}}\right) \ge \Phi\left(\frac{a\sqrt{r}}{\sigma_{Y,d} + \sigma_d}\right)$$

Equation (7) gives an estimate of the watermark bit detection rate in the presence of delay jitters. The correlation coefficient $Cor(Y_{k,d}, X_k)$, whose value range is [−1, 1], models correlation between the network delay jitter and the packet timing of the original packet flow. In case the delay jitter is independent from the packet timing of the packet flow, Cor $(Y_{k,d}, X_k)$ will be 0.

A result here is that no matter what variance $Y_{k,d}$ may have (as long as it exists), no matter how large a variance the network jitter may have, no matter how small the timing adjustment a>0 (or the watermark embedding strength) might be, one may make the watermark bit detection rate arbitrarily close to 100% by increasing the redundancy number r. This result holds true regardless of the distribution of the network delay jitter.

Transparent Watermarking of VoIP Flows in Real Time.

In order to be able to watermark any VoIP flows transparently, it may be desirable to have a VoIP gateway which forwards the VoIP flows and watermarks any specified bypassing VoIP flows with specified watermarks. To embed the watermark into the inter-packet timing of a VoIP flow, a capability to delay specified packet of specified flow for specified duration is needed. We choose to implement such a capability in the kernel of the Linux operating system.

One challenge in implementing the transparent and real-time VoIP watermarking engine is how to precisely delay an outgoing packet in real-time. The inter-packet arrival time of normal VoIP flows is either 20 ms or 30 ms. This means that the delay of any VoIP packet should be less than 20 ms. In order to hide the watermark embedding into the "background noise" introduced by the normal network delay jitter, the delay of any VoIP packet should be no more than a few milliseconds. To achieve packet delay of such a precision, the operating system must provide a hard real-time scheduling capability.

However, the standard Linux kernel lacks the hard real-time scheduling capability and it does not support time-critical tasks. Because the standard Linux is a time-sharing OS, the execution of any process depends on not only the priority of the process but also the current load in the OS, and there is no guarantee that a time-critical task will be processed and completed on time. In addition, the resolution of the software timer in the Linux kernel is by default 10 ms, which is too coarse for our needs.

One way to achieve guaranteed high precision is to build a packet delay capability upon the Real Time Application Interface (RTAI) of Linux. The following features of RTAI make it an attractive platform for implementing the high precision packet delay capability:

The hard real-time scheduling functions introduced by The RTAI coexist with all the original Linux kernel services. This makes it possible to leverage existing Linux kernel services, especially the IP stack components, from within the real-time task.

The RTAI guarantees the execution time of real-time tasks regardless of the current load of non real-time tasks.

The RTAI supports high precision software timer with the resolution of microseconds.

A transparent and real-time VoIP watermarking engine may be built upon RTAI 3.1 in Linux kernel 2.6.8.1 with the VoIP watermarking engine implemented as an RTAI kernel module. To facilitate the management of the kernel VoIP watermarking engine from user space, the netfilter/iptable mechanism in Linux kernel may also be extended.

By integrating the RTAI hard real-time scheduling and the Linux kernel functionality, the real-time VoIP watermarking engine should achieve the guaranteed delay precision of 100 microseconds over any specified packets of any specified flows despite the workload of the Linux kernel.

Experiments

Figure 9:
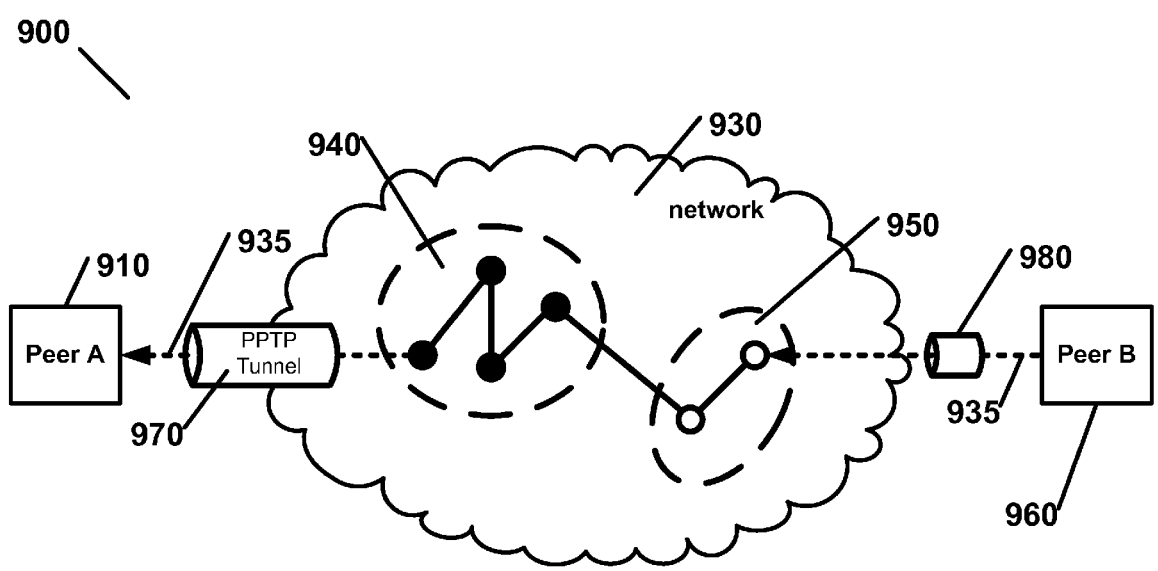
FIG. 9 is a block diagram of a setup for the real-time tracking of anonymous peer to peer VoIP calls across the internet using an aspect of an embodiment of the present invention.

It was possible to empirically validate the active watermark based tracking of anonymous, peer-to-peer VoIP calls on the Internet. In specific, experiments with real-time Skype peer-to-peer VoIP calls over the commercially deployed anonymizing system of findnot.com was conducted. FIG. 9 shows the experimental setup for these real-time tracking of anonymous peer to peer Skype VoIP calls across the Internet. The Skype peer A 1010 is connected to an entry point of the anonymizing network 1030 of findnot.com via PPTP (Point to Point Tunnel Protocol) 1010 and all the Internet traffic of Skype peer A 1010 is routed through and anonymized by the anonymizing network of findnot.com 1030. As a result, Skype peer B 1060 never sees the real IP address of Skype peer A 1010, and Skype peer A 1010 could appear to be some host of thousands miles away. In the experimental setup, the two communicating Skype peers are at least 27 hops away with about 60 ms end to end latency.

The high precision VoIP watermarking engine 1030 was placed between Skype peer B 1060 and the Internet 1030 and let it transparently watermark the VoIP flow from Skype peer B to peer A. The VoIP flow is intercepted from the anonymizing network of findnot.com to Skype peer A, where attempts to detect the watermark from the intercepted VoIP flow are made.

While Skype VoIP calls can use both TCP and UDP, it found that they almost always use UPD. In the experiments, all the Skype calls happen to be UPD, and none of them had noticeable packet loss.

Watermarking Parameter Selection

Equation (7) gives the quantitative tradeoff between the watermark bit detection rate, watermark embedding parameters and the defining characteristics of the network delay jitters.

To make the embedded watermark more robust against the network delay jitters and have high watermark bit detection rate, it may be desirable to have a larger watermark embedding delay a and bigger redundancy number r. However, a bigger watermark embedding delay means bigger distortion of the original inter-packet timing of the VoIP flow, which could potentially be used by the adversary to determine if a VoIP flow has been watermarked or not. Ideally, the delay introduced by the watermark embedding should be indistinguishable from the normal network delay.

Figure 10A:
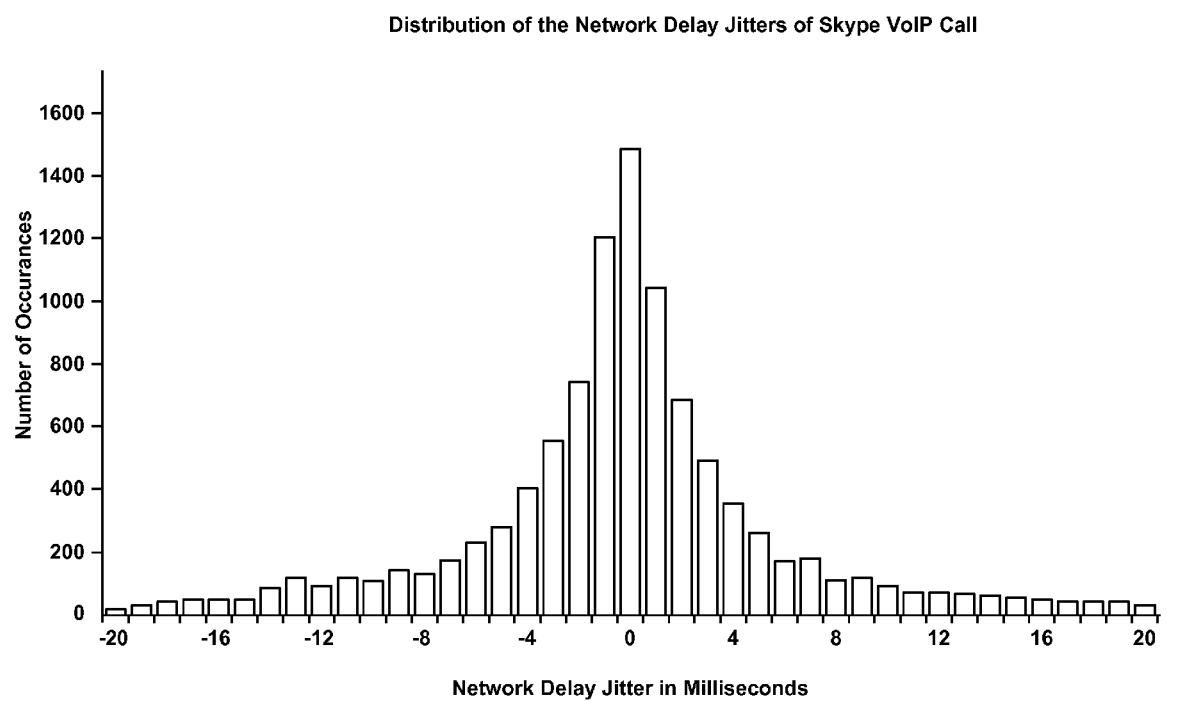
FIG. 10 shows the distribution of network delay jitters of a VoIP call resulting from an experiment using an aspect of an embodiment of the present invention.

To understand the normal network delay jitter as well as the hiding space for embedding our transparent watermark into the inter-packet timing of VoIP flows, a Skype call of 6 minutes long was made without watermarking, and the traces of the VoIP flows from both Skype peer A and B were collected. The network delay jitter was calculated by comparing the timestamps of 10424 corresponding packets between the two VoIP flows. FIG. 10 shows the distribution of the normalized network delay jitters. It indicates that there are about 50% chances that the network delay jitter will be equal to or bigger than 3 ms. Therefore, it would be hard to distinguish any watermarked VoIP flow from unwatermarked ones if the watermark is embedded with a 3 ms delay.

Figure 11:
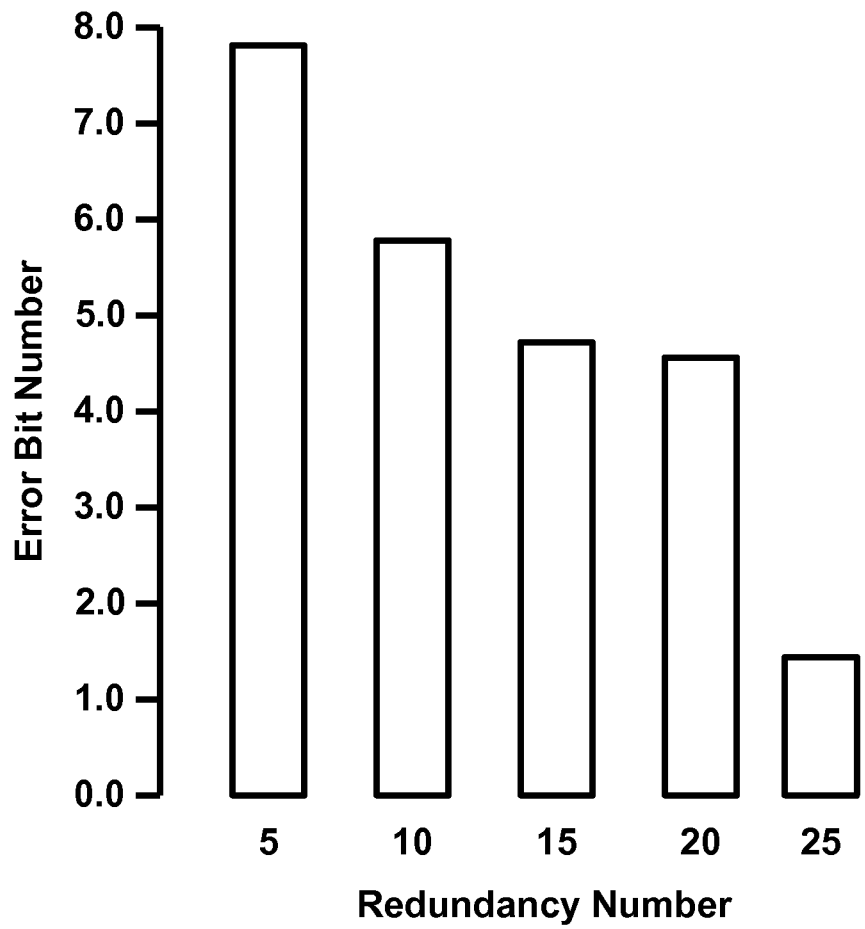
FIG. 11 shows the average number of bit errors vs the redundancy number r' resulting from an experiment using an aspect of an embodiment of the present invention.

With watermark embedding delay a=3 ms, different redundancy numbers r were tried to embed a 24-bit watermark into the Skype VoIP calls over the same anonymizing network of findnot.com. FIG. 11 shows the average number of the error bits of the decoded watermarks of 10 Skype calls with a range of redundancy numbers. It shows that the number of error bits can be effectively decreased by increasing the redundancy number r. With redundancy number r=25, the average number of error bits of the decoded 24-bit watermark is only 1.4.

In all of the following experiments, 24-bit watermarks were used with embedding delay a=3 ms and redundancy number r=25. With this set of watermarking parameters, the watermarking of VoIP flow only requires 1200 packets to be delayed by 3 ms. Given the 30 ms packetization interval of Skype VoIP calls, the transparent watermarking can be applied to any VoIP calls that are as short as 90 seconds.

True Positive Experiments

Figure 12A:
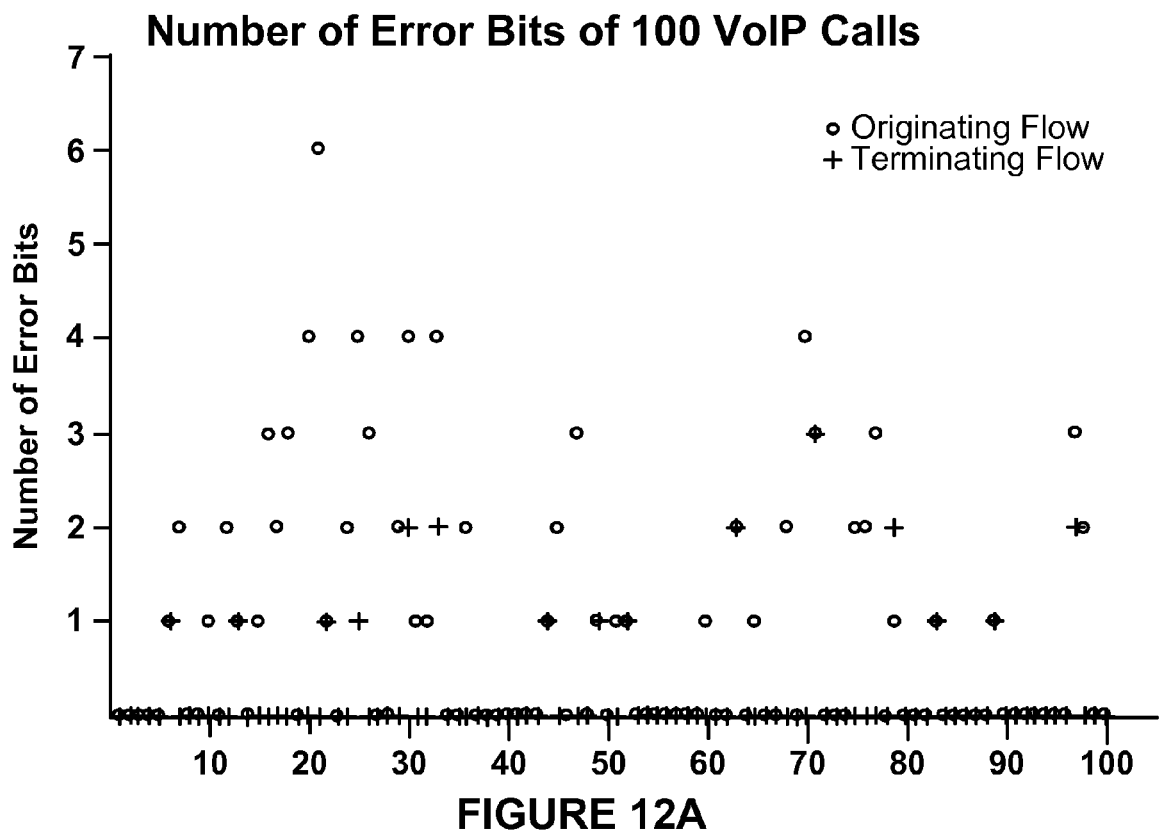
FIG. 12A shows the number of Error bits of 100 VoIP calls resulting from an experiment using an aspect of an embodiment of the present invention.
Figure 12B:
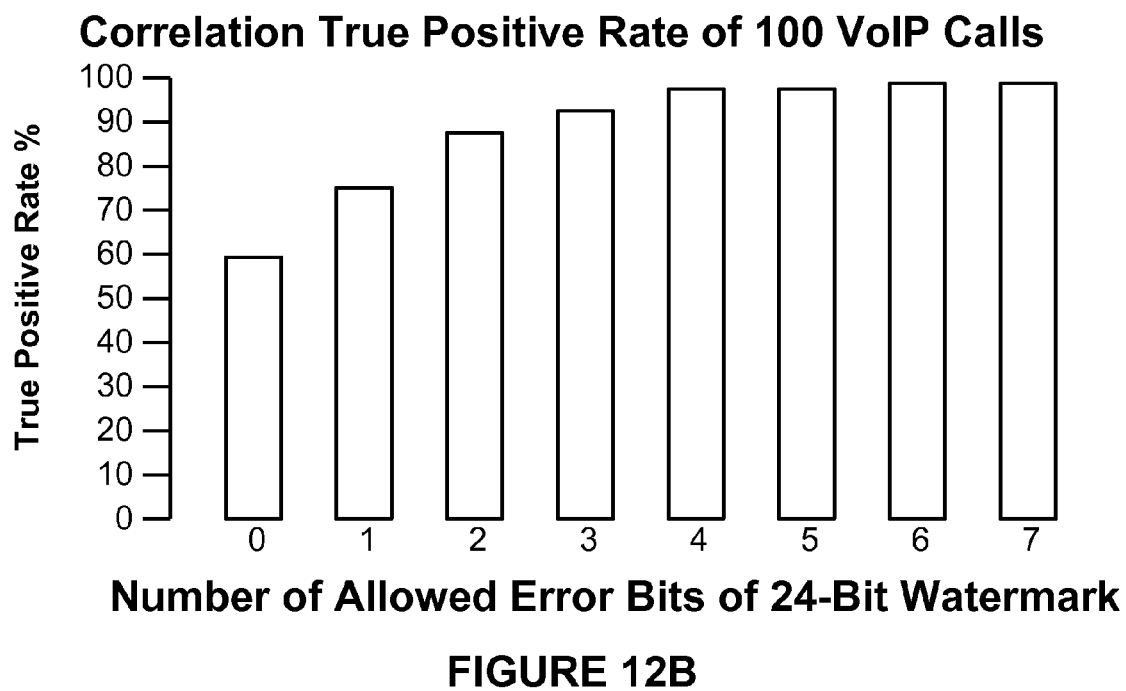
FIG. 12B shows correlation true positive rate of 100 VoIP calls resulting from an experiment using an aspect of an embodiment of the present invention.

One-hundred 24-bit watermarks were randomly generated such that the Hamming distance between any two of them was at least 9. Then one-hundred Skype calls of 2 minutes long were made. Each of the calls was watermarked with a different watermark. The originating and terminating watermarked VoIP flows were collected from Skype peer B and A respectively, and the 24-bit watermarks from them were decoded. Any bit in the decoded 24-bit watermark that is different from the corresponding embedded bit was called as an error bit. FIGS. 12A and 12B show the number of error bits of the one-hundred Skype VoIP calls and the watermark detection true positive rates given different numbers of allowed error bits. It indicates that very few of the one-hundred watermarked originating flows has 1 or 2 error bits, and a number of watermarked terminating flows has 1 to 6 error bits. If an exact match is required between the embedded watermark and the detected watermark, then there is a 59% true positive rate. If the number of allowed error bits is increased to 4, the true positive rate becomes 99%. With number of allowed error bits being 6 or greater, there is a 100% true positive rate.

False Positive Experiments

No matter what watermark is chosen, it is always possible that an unwatermarked VoIP flow happens to have the chosen watermark naturally. This case is called a false positive in correlating the VoIP flows.

The true positive rate has been shown to be generally higher if the number of allowed error bits is bigger. However, a bigger number of allowed error bits tends to increase the false positive rate. Therefore, it is important to choose an appropriate number of allowed error bits that will yield both high true positive rate and low false positive rate at the same time. To find the appropriate number of allowed error bits, one may need to know the false positive rates under different numbers of allowed error bits.

Assuming the 24-bit watermark decoded from a random flow is uniformly distributed, then the expected false positive rate with h h≥0 allowed error bits will be $$\sum_{i=0}^{h} \binom{24}{i} \left(\frac{1}{2}\right)^{24} \quad (8)$$

Because each of the one-hundred Skype calls is watermarked with different watermark, any of the 100 watermarked Skype flows has 99 uncorrelated watermarked Skype flows. Ideally, the number of different bits between the 24-bit watermarks decoded from different watermarked flows should be high.

Figure 13:
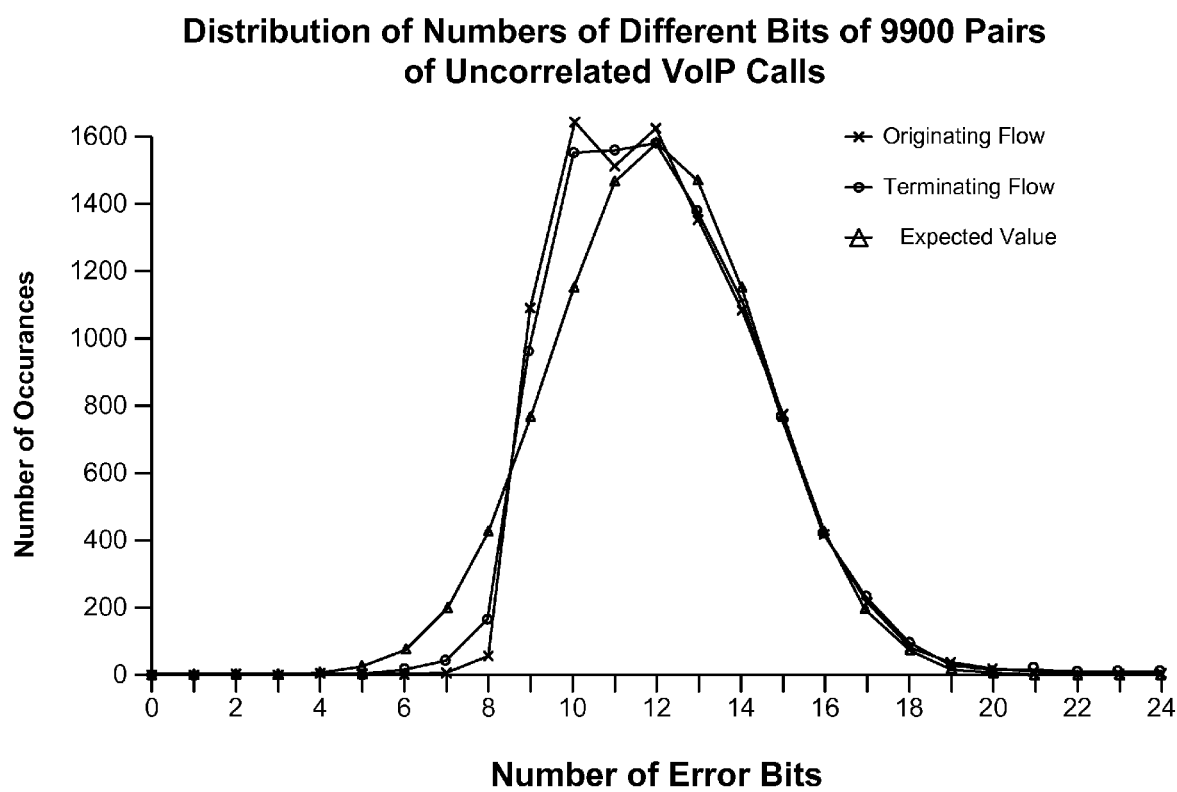
FIG. 13 shows the distribution of numbers of different bits of 9900 pairs of uncorrelated VoIP calls resulting from an experiment using an aspect of an embodiment of the present invention.
Figure 14:
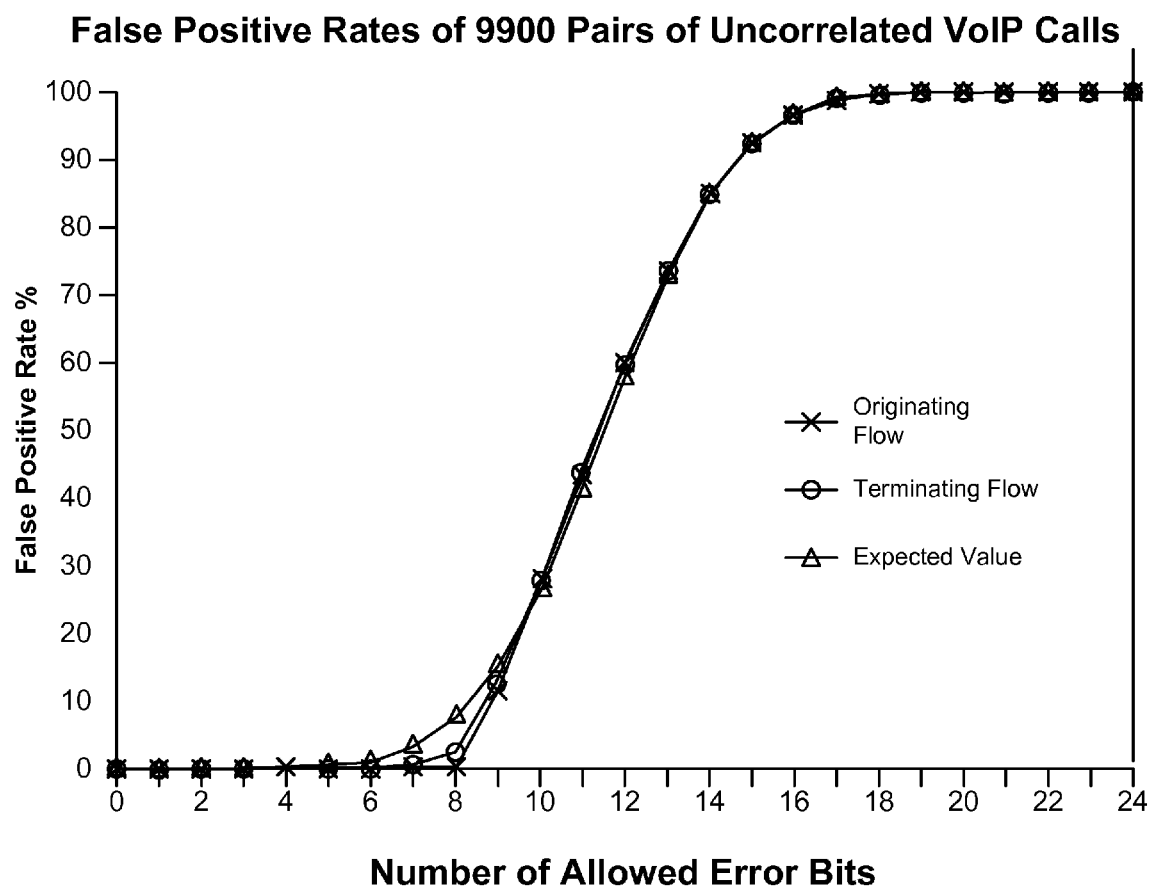
FIG. 14 shows the false positive rates of 9900 pairs of uncorrelated VoIP calls resulting from an experiment using an aspect of an embodiment of the present invention.

FIG. 13 shows the expected and measured numbers of different bits between the 24-watermarks decoded from the 9900 pairs of uncorrelated VoIP flows as well as the expected and measured watermark detection false positive rates under various numbers of allowed error bits. It indicates that the measured values are very close to expected value. This validates our assumption that the 24-bit watermark decoded from a random flow is uniformly distributed.

Out of the 9900 pairs of uncorrelated flows, no one has less than 6 different bits between the two watermarks decoded. There are 10 pairs of uncorrelated flows that have 6 different bits. Therefore, if 5 is chosen as the number of allowed error bits, there would be a 99% true positive rate and 0% false positive rate. If 6 is used as the number of allowed error bits, one gets a 100% true positive rate and 0.1% false positive rate.

Tracking encrypted, peer-to-peer VoIP calls has been widely viewed as impossible, especially when the VoIP calls are anonymized by the low latency anonymizing system. Embodiments of the present invention demonstrates (1) tracking anonymous, peer-to-peer VoIP calls on the Internet is feasible; and (2) low latency anonymizing system is susceptible to timing based attack.

The embodiments used for tracking anonymous, peer-to-peer VoIP calls is based on subtle and deliberate manipulation of the inter-packet timing of selected packets of the VoIP flow. Experiments of the real-time peer-to-peer VoIP calls over a commercially deployed anonymizing system show that the encrypted and anonymized VoIP flow could be made highly unique with only 3 ms timing adjustment on selected packets. This level of timing adjustment is well within the range of normal network delay jitters. The results also show that these watermark based tracking embodiments can be effectively applied to any peer-to-peer VoIP calls that are at least 90 seconds long.

As described, earlier, these embodiments and experiments were provided to show a specific example of how the present invention may be used. One skilled in the art will recognize that these techniques may be used to transport more that an identifying watermark through the side channel. In fact, it is anticipated that the side channel be used in other embodiments to transport other types of hidden data.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) of different methods and systems to identify VoIP communications. However, those experienced in the art will realize that multiple other embodiments, including, but not limited to methods, apparatuses and systems to covertly communicate data on top of any type of packet streams.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method for embedding a covert side channel communication in an overt communication transmitted over a network using a packet stream comprising:
 a. encoding one or more bits of a side channel communication by:
  i. selecting more than one group of related packets from the overt communication being transmitted on a network, each group of packets including a same number of packets, the related packets being consecutive as well as non-consecutive packets; and
  ii. relating a packet of one group to a packet of another group to form a pair of packets; and
  iii. delaying the timing of at least one packet from each pair of packets;
 b. decoding a bit from the side channel communication by:
  i. determining inter-packet delays that are the difference in timing between two packets in the pair of packets from the overt communication;
  ii. determining at least one inter-packet delay difference between two or more determined inter-packet delays; and
  iii. converting the at least one interpacket delay difference into at least one bit.

2. The method of claim 1, wherein the encoding uses an encoding algorithm.

3. The method of claim 1, wherein the decoding uses a decoding algorithm complementary to the encoding algorithm.

4. The method of claim 1, wherein the encoding and the decoding use a shared secret.

5. The method of claim 1, wherein the side channel communication includes a watermark.

6. The method of claim 1, wherein the overt communication includes a VoIP communication.

7. The method of claim 1, wherein the side channel communication identifies the overt communication.

8. The method of claim 1, wherein the encoding and the decoding are performed on opposite sides of a router.

9. The method of claim 1, wherein bits are redundantly encoded.

10. An apparatus for encoding one or more bits of a covert side channel communication transmitted over a network using a packet stream, comprising:
 a. a packet group selection module configured to select at least two groups of related packets from the overt communication being transmitted on a network, each group of packets including a same number of packets;

b. a packet relation module configured to relate a packet of one group to a packet of another group to form a pair of packets; and c. a packet delay module configured to delay the timing of at least one packet from each pair of packets, wherein at least one of the packet group selection module, the packet relation module and the packet delay module is to be implemented by one or more processors of the apparatus.

11. The apparatus of claim 10, wherein the packet group selection module, the packet relation module and the packet delay module implement an encoding algorithm.

12. The apparatus of claim 10, wherein the selection module selects more than one group of packets in a random manner.

13. The apparatus of claim 10, wherein the packet delay module delays the timing of the at least one packet without buffering the packets.

14. The apparatus of claim 10, wherein the side channel communication includes a watermark.

15. The apparatus of claim 10, wherein the overt communication includes a VoIP communication.

16. The apparatus of claim 10, wherein the side channel communication identifies the overt communication.

17. An apparatus for decoding a bit from a covert side channel communication in an overt communication transmitted over a network using a packet stream, comprising:

a. an inter-packet delay determination module configured to determine inter-packet delays that are the difference in timing between two packets in a pair of packets from the overt communication;

b. a difference determination module configured to determine at least one inter-packet delay difference between two or more determined inter-packet delays; and c. a bit extraction module configured to convert the at least one interpacket delay difference into at least one bit, wherein at least one of the inter-packet delay determination module, the difference determination module and the bit extraction module is to be implemented by one or more processors of the apparatus.

18. The apparatus of claim 17, wherein the inter-packet delay determination module, the difference determination module and bit extraction module implement a decoding algorithm.

19. The apparatus of claim 17, wherein the overt communication includes redundantly encoded bits.

20. The apparatus of claim 17, wherein the side channel communication identifies the overt communication.

* * * * *